United States Patent [19]

Shaffer et al.

[11] 4,260,402
[45] Apr. 7, 1981

[54] HOUSING MEANS FOR DEFINING AIR/OIL SEPARATOR AND OIL RESERVOIR ASSEMBLY

[75] Inventors: Robert W. Shaffer; Henry W. Morse, both of Campbellsville, Ky.

[73] Assignee: Ingersoll-Rand Company, Woodcliff Lake, N.J.

[21] Appl. No.: 39,793

[22] Filed: May 17, 1979

[51] Int. Cl.³ .............................................. B01D 50/00
[52] U.S. Cl. ...................................... 55/505; 55/330; 55/337; 55/385 R; 55/478; 55/DIG. 25; 55/462
[58] Field of Search ................. 55/322, 323, 327, 330, 55/337, 385 R, 472, 478, 482, 505, DIG. 25, 462; 62/469; 417/372; 220/22

[56] References Cited

U.S. PATENT DOCUMENTS

| 672,531 | 4/1901 | Hunter | 55/322 |
|---|---|---|---|
| 1,177,262 | 3/1916 | O'Donnell | 55/323 |
| 2,553,326 | 5/1951 | Manning | 55/478 |
| 2,642,148 | 6/1953 | Grise | 55/472 |
| 2,726,732 | 12/1955 | Faust et al. | 55/327 |
| 3,054,246 | 9/1962 | Jennings | 55/462 |
| 3,368,334 | 2/1968 | West | 55/505 |
| 3,653,191 | 4/1972 | Nelson et al. | 55/310 |
| 3,676,024 | 7/1972 | Akaika et al. | 55/327 |
| 3,722,187 | 3/1973 | Potter et al. | 55/337 |
| 4,170,877 | 10/1979 | Pickering | 220/22 |

OTHER PUBLICATIONS

Super Spiro-Flo XL Series Portable Compressors 175, 750, 900 and 1,200 cfm, Ingersoll-Rand 1970.

*Primary Examiner*—David L. Lacey
*Attorney, Agent, or Firm*—Bernard J. Murphy

[57] ABSTRACT

The invention comprises a die-cast housing of substantially dish shape having a peripheral bolting flange for replaceable mounting thereof to the end wall of an oil-flooded gas compressor. The housing has a partition formed therein to subdivide the same into a first, gas admittance area and a second, air/oil separator and oil reservoir area. The housing has a first port formed therein opening onto the first area for admitting ambient air thereinto for conduct thereof to a compressor gas inlet port, and a second port opening onto the second area for discharging compressed gas therethrough. The second area of the die-cast housing is adapted to confine therewithin the compressed gas discharge pipe of a compressor and, therebelow, a reservoir of oil.

4 Claims, 2 Drawing Figures

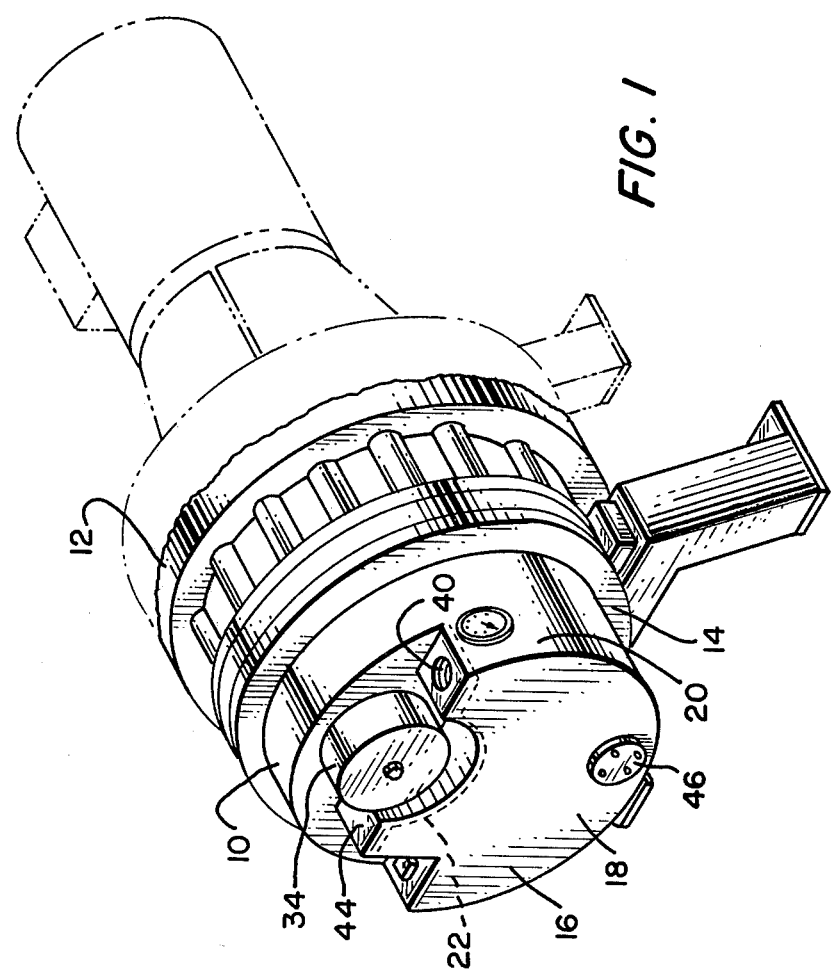

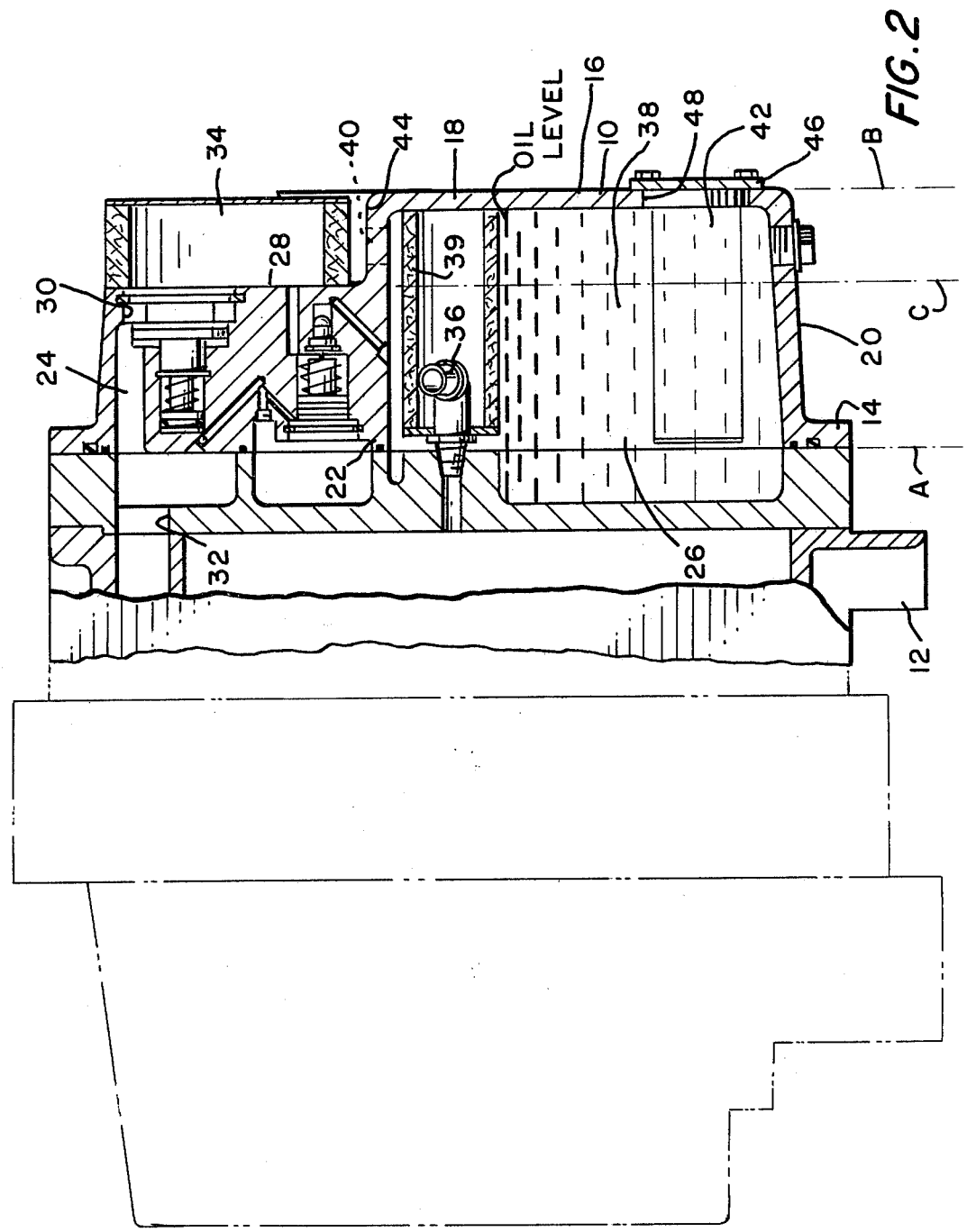

HOUSING MEANS FOR DEFINING AIR/OIL SEPARATOR AND OIL RESERVOIR ASSEMBLY

This invention pertains to air/oil separators and to oil reservoirs, for oil-flooded gas compresors, and in particular to housing means for mounting thereof to an oil-flooded gas compressor for defining an air/oil separator and oil reservoir assembly for the compressor.

Oil separation equipment for oil-flooded, gas compressors, generally comprises a tank separate from the compressor and joined thereto by external piping. Such oil separation tanks are bulky, expensive and unattractive. Also, oil pumps are generally required to circulate and meter the oil flow to the compression chamber.

It is an object of this invention to set forth an improved housing means for defining an air/oil separator and oil reservoir assembly for an oil flooded compressor system which, by way of example, uses a scroll-type compressor, which obviates any need for an external, pipe-connected tank, or for an oil pump. It is also an object of this invention to disclose housing means of the type noted, comprising means for defining an air/oil separator, which also functions as an oil reservoir, and is separably demountable from the compressor housing. This renders the housing means easily accessible for maintenance, changing of filters, cleaning, etc. It also enables the housing means to be made of a simple die casting, which greatly reduces the cost of oil separation systems.

It is particularly an object of this invention to set forth housing means, for mounting thereof to an oil-flooded compressor, for defining an air/oil separator and oil reservoir assembly for an oil-flooded gas compressor, comprising a die-cast housing; said housing being of substantially dished shape, having a first, substantially uniplanar wall, and a second, perimetrical wall joined to said first wall, about the terminal edges of, and substantially normal to, said first wall; said second wall having mounting surfacing formed thereon for replaceably fixing said housing to an end wall of a gas compressor; an arcuate partition formed in said housing, said partition extending substantially normal from an innermost surface of said first wall, subdividing said housing into a first gas admittance area and a second, air/oil separator and oil reservoir area; said partition comprising means for prohibiting fluid-flow communication between said first and said second areas said first wall having a relieved or recessed portion; said recessed portion having a gas admittance port formed therein and opening therethrough onto said first area; and a gas discharge port in said first wall and opening therethrough and onto said second area. Features of the invention are characterized in this, that the housing means, comprising means for defining an oil separator which also acts as an oil reservoir and contains an oil filter, air inlet filter and a coalescing type oil separation element. It can also be arranged to contain the suction-/unloader valve for the gas compressor. Further, no pump is required since the oil reservoir is at discharge pressure (and all oil passages to and from the heat exchanger are internal to the machine).

Further objects and features of this invention will become more apparent by reference to the following description, taken in conjunction with the accompanying figures, in which:

FIG. 1 is an isometric projection of an oil-flooded, rotary, gas compressor which, to the foreground end thereof, has an embodiment of the novel housing means for defining an air/oil separator and oil reservoir assembly replaceably attached; and FIG. 2 is a vertical, cross-sectional view of the novel housing means affixed to a substantially line-drawn outline of the gas compressor.

As shown in the figures, an embodiment of housing means 10 for defining an air/oil separator and oil reservoir assembly which has been die-cast, is removably bolted to the inlet/discharge end of a rotary, oil-flooded compressor 12. The housing means 10 has an external, circular bolting flange 14 formed thereon, and subsisting in a given plane "A", for attachment purposes.

The housing means 10 is defined by a body or housing 16 which is substantially of dished shape, having a first, substantially uniplanar wall 18 to which is joined a second, peripheral wall 20—which terminates in the flange 14. An arcuate partition 22, extending normally from the innermost surface of wall 18, subdivides the inside of the housing 16 into a gas admittance area 24 and an air/oil separator and oil reservoir area 26.

The outermost surface of wall 18 subsists in a plane "B", and a relieved or recessed portion 28 thereof has a planar surface which lies in an intermediate plane "C". Through this latter surface there is formed a gas admittance port 30 for communication of the atmosphere with the compressor inlet port 32—via admittance area 24. A gas filter 34 is fixed over port 30, the same being replaceably bolted to portion 28. The relief or recess of portion 28 insures that the filter 34 is unobtrusively confined within the overall width or depth dimension of the novel housing means 10 which extends between planes "A" and "B".

The compressed gas product exits from the compressor 12 via a pipe 36 which discharges into area 26.

The oil and air mixture is then thrown out against the walls of area 26 where the large droplets of oil separate and run back into the oil reservoir 38. The air then flows thru a coalescing type oil separator/demister 39 which is in the housing 16 and is discharged thru an opening 40.

Oil in the reservoir 38 flows, due to the discharge pressure in the area 26, thru an oil filter 42. The oil then travels thru internal passages (not shown) to the compressor 12.

The opening 40 is provided in a shoulder 44 which joins the recessed portion 28 with the outermost portion of wall 18 —whereby, again, no obtrusive neck or coupling adapter therefor projects beyond the plane "B".

Patently, the housing means 10 is readily removable from the compressor 12 for servicing, cleaning, replacement, etc., without requiring disassembly or disabling of the compressor. All compressor-to-assembly fluid communication can be accommodated with internal conduits, obviating any need for external inter-piping. The air filter 34 lends itself to facile servicing, and the oil filter 42 as well. The latter is fixed behind an access plate 46 which covers an access aperture 48 formed in wall 18.

While we have described our invention in connection with a specific embodiment thereof, it is to be clearly understood that this is done only by example and not as a limitation of the scope of the invention as set forth in the objects thereof and in the appended claims.

We claim:

1. Housing means, for mounting thereof to an oil-flooded gas compressor, for defining an air/oil separator and oil reservoir assembly for the compressor comprising:
- a die-cast housing;
- said housing being of substantially dished shape, having a first, substantially uniplanar wall, and a second, perimetrical wall joined to said first wall, about the terminal edges of, and substantially normal to, said first wall;
- said second wall having mounting surfacing formed thereon for replaceably fixing said housing to an end wall of a gas compressor;
- an arcuate partition formed in said housing, said partition extending substantially normal from an innermost surface of said first wall, subdividing said housing into a first, gas admittance area and a second, air/oil separator and oil reservoir area;
- said first wall having a relieved or recessed portion;
- said recessed portion having a gas admittance port formed therein and opening therethrough onto said first area; and
- a gas discharge port in said first wall and opening therethrough and onto said second area; wherein
- said first wall has an outermost surface which subsists in a first plane;
- said mounting surfacing subsists in a second plane parallel to said first plane;
- said first and second planes defining therebetween the depth or width dimension of said housing means; and further including
- a gas filter replaceably mounted to an outermost surface of said first wall, said filter being confined within said dimension; and
- said gas filter is mounted in said recessed portion, and overlies said gas admittance port.

2. Housing means, according to claim 1, wherein:
- said first wall has a section thereof which subsists in a third plane which is parallel to, and intermediate said first and second planes, and said first wall further has a shoulder portion lying normal to and joining said outermost surface and said section; and
- said gas discharge port is formed in said shoulder portion.

3. Housing means, according to claim 1, wherein:
- said first wall has an access aperture formed therein which opens onto one of said first and second areas.

4. Housing means, according to claim 3, wherein:
- said aperture opens onto said second area, for cleaning and servicing of the latter; and further including
- a closure replaceably fastened to said first wall over said aperture.

* * * * *